E. F. BASSETT.
CRANBERRY PICKER.
APPLICATION FILED JULY 13, 1916. RENEWED FEB. 21, 1919.

1,309,009.

Patented July 8, 1919.
2 SHEETS—SHEET 1.

WITNESSES:
Leo J. Griffin

INVENTOR,
EDGAR F. BASSETT,
Frank H. Allen
BY Frederick K. Daggett
ATTORNEYS.

E. F. BASSETT.
CRANBERRY PICKER.
APPLICATION FILED JULY 13, 1916. RENEWED FEB. 21, 1919.
1,309,009.
Patented July 8, 1919.
2 SHEETS—SHEET 2.
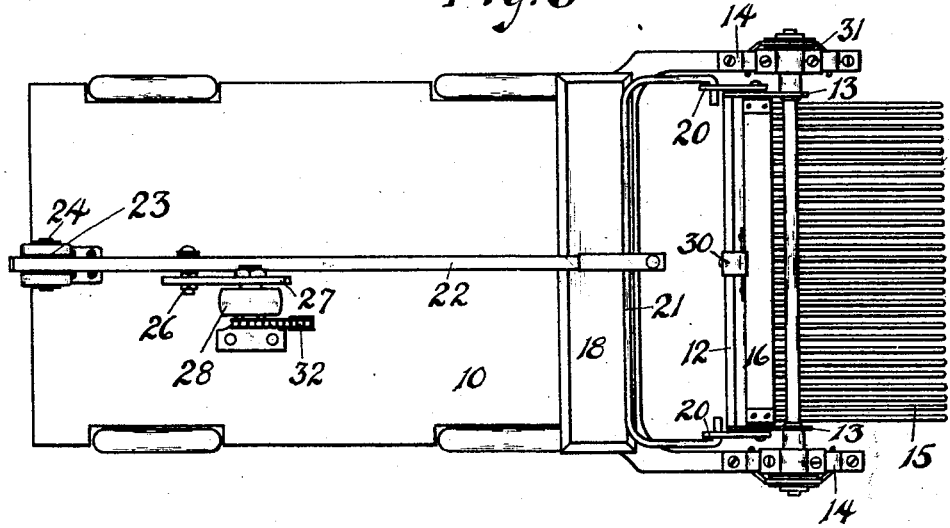
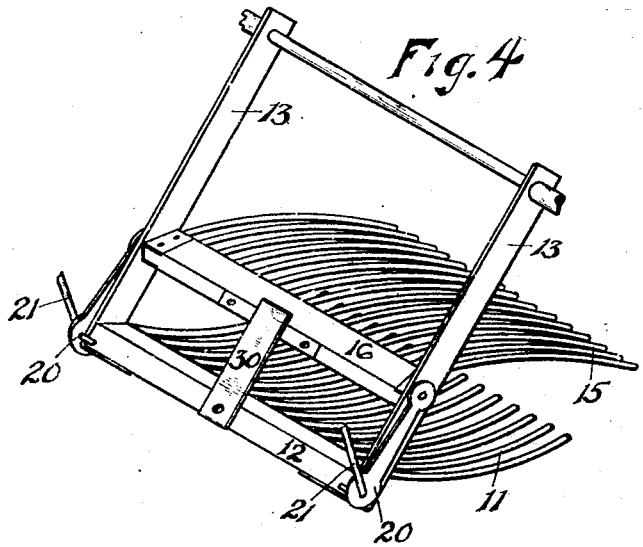
WITNESSES:
Leo J. Griffin.
INVENTOR,
EDGAR F. BASSETT,
BY Frank H. Allen
Frederick K. Daggett.
ATTORNEYS.

UNITED STATES PATENT OFFICE.

EDGAR F. BASSETT, OF HARWICH, MASSACHUSETTS.

CRANBERRY-PICKER.

1,309,009.      Specification of Letters Patent.      Patented July 8, 1919.

Application filed July 13, 1916, Serial No. 109,162. Renewed February 21, 1919. Serial No. 278,510.

*To all whom it may concern:*

Be it known that I, EDGAR F. BASSETT, a citizen of the United States, residing at Harwich, in the county of Barnstable and State of Massachusetts, have invented a certain new and useful Improvement in Cranberry-Pickers of which the following is a specification, reference being had to the accompanying drawings.

This invention relates to machines for automatically picking cranberries and it has for its immediate object the production of a machine which will pick the fruit rapidly without bruising it and will screen the fruit and deliver it into a suitable receptacle; the action of the machine, when in service, resembling hand picking.

Figure 1:
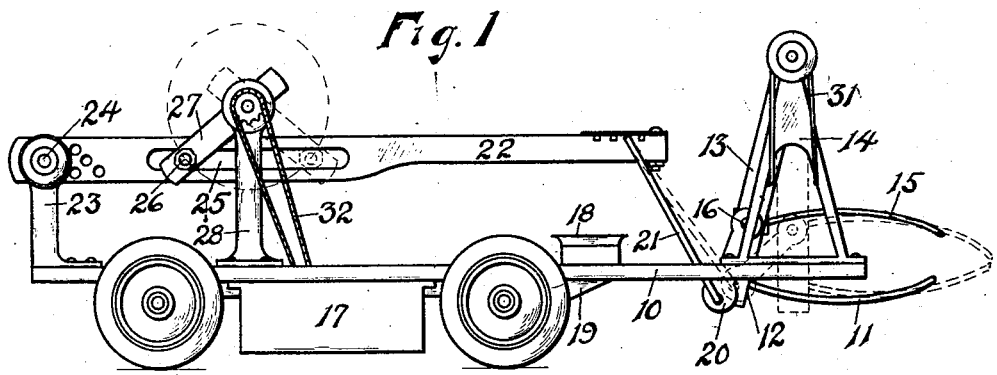
Figure 2:
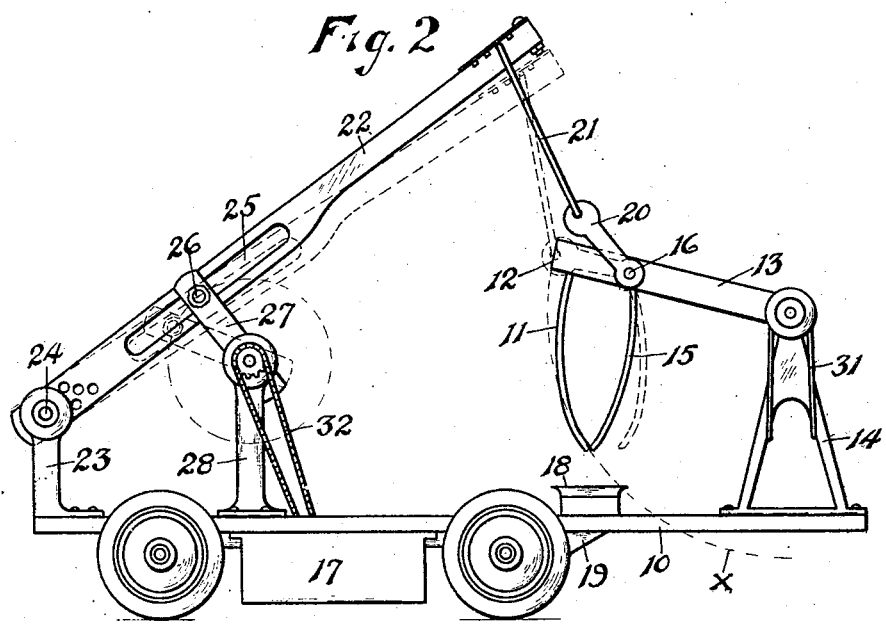

My improved machine is clearly illustrated in the annexed drawings, Figure 1 being a side elevation of a cranberry picking machine embodying my present improvements showing the rake in position for stripping berries from the plants and Fig. 2 is a similar view of the machine showing the said rake in position to dump its load of berries into a screening receptacle.

Fig. 3 is a plan view of the machine showing the operative parts in the positions illustrated in Fig. 1. Fig. 4 is a relatively enlarged, detached, perspective, view of the rake and its supporting bar.

Referring to these drawings the numeral 10 indicates the bed upon which the operative parts of the cranberry picker are mounted, said bed being, preferably, the chassis of an automobile, or other power-driven vehicle.

Briefly described, said picking mechanism consists of a rake-like device which is caused to swing forward with a long, scooping movement, through the mass of plants, at such an elevation that the teeth or tines of the rake will clear the ground but will pass just below the berries as the latter hang on the plants, the berries being thus stripped from the plants and carried along by the rake; the teeth of the rake being so spaced apart that the berries cannot pass therebetween. At stated times the rake, with its load of berries, is swung rearward, and upward, over a crib or other receptacle carried by the machine and the berries are then dropped into the said receptacle; the bottom of the receptacle being adapted in practice to allow all dirt, leaves, and other deleterious matter to fall therethrough and thus be separated from the berries as the machine jolts along.

The rake teeth are designated by the numeral 11 and they are fixedly mounted in a bar 12 which is carried by arms 13 that are journaled at their other ends in stands 14 mounted on the front end portion of the chassis 10; the arrangement of the rake and its supports being such that, when the arms 13 are swung downward and forward, the rake teeth 11 will traverse the arc-shaped path indicated by the dotted line *x* in Fig. 2 of the drawings and the free points of the said teeth will thus be caused to pass through the mass of cranberry plants with a scooping and stripping action.

Coöperating with the rake 11 is an opposing similar structure having teeth 15 that are mounted in a shaft or bar 16 which is pivoted in the arms 13 in such manner that when the bar 16 is suitably rocked in its supports, the free ends of the teeth 15 will be moved into engagement with the free ends of the rake teeth 11 and a cage will thus be formed in which the load of berries last picked by the rake may be retained until such time as the said cage is moved to a position over the receptacle which I have already mentioned briefly, and just at that instant the cage is opened automatically and the berries drop by gravity into the receptacle.

Said receptacle may be a box carried on the chassis or, preferably, a box 17 that is suspended below the said chassis and is adapted to be withdrawn from either side of the vehicle and emptied. In the machine here illustrated the berries, when dumped from the cage, drop into a hopper 18 and pass thence by gravity down a chute 19 into the receptacle 17.

The rod 16, to which the teeth 15 are fastened, has secured to its opposite ends arms or links 20 whose free end portions are connected by a bail-like wire 21 with one end of the bar 22 whose other end is journaled in a stand 23, at 24, the said bar 22 being slotted, as at 25, to receive a wrist-pin 26 carried by the free end portion of an arm 27 that is mounted to rotate in a stand 28; the arrangement of the described parts being such that, when the arm 27 is caused to rotate the wrist-pin 26, sliding in the slot 25 will move the front, free, end of the arm 22 downward and upward with a long, sweeping, reciprocating movement and, as a result of such movement, the links 20 and the connected arms 13 and the described "cage" will be caused to sweep downward and forward to strip off and scoop up a load of berries, and will then move back to the proper position to dump the said load into the hopper 18.

I will now describe the peculiar and novel operation of the rakes 11 and 15 whereby the cage which I have mentioned is opened as the rake 11 swings forward to strip off a load of berries and closes as the said rake starts rearward with the said load. Secured to the cross bar 12 which connects the otherwise free ends of the bars 13, is a flat spring 30 whose free end presses against the bar 16 which carries the rake 15, with sufficient frictional force to hold the bars 12 and 16 in yielding relation to each other under ordinary conditions but which will permit said bars to be moved and rearranged with respect to each other under certain conditions. By reference to Figs. 1 and 2 of the drawings it will be noted that I have provided a stiff spring 31 which encircles, or partially encircles, the journal support of the arms 13, the purpose of said spring being to provide a degree of frictional resistance that will be somewhat greater than that of the spring 30 above referred to and so that, when the bar 22 starts to descend, the links 20 and the connected teeth 15 will first be moved into the position seen in dotted lines, in Fig. 2, so as to open the cage. Further movement of arm 22 will then operate to swing the open cage downward and forward, which movement of said arm is controlled by the action of bail 21, so that the rake may strip off a fresh load of berries. As the arm 22 starts on its return (upward) movement it first rocks the links 20 and the teeth 15 to close the cage and then swings the closed cage rearward and upward into the position seen in full lines in Fig. 2, the cage remaining closed until arm 22 again starts downward when the cage is opened and dumped in the manner already described.

The rotation of the arm 27 is preferably effected by connection (by belt or chain 32) with some suitable element of the power-driven vehicle but, in such an instance, the relation of the advance movement of the vehicle, to the stripping and dumping action of the rake, should be such that the rake will operate rapidly enough to collect the berries from the entire path traversed by the machine, in other words, the rake will swing ahead of the machine and return and dump its load, with a rapid movement and go forward again to begin raking where it last left off, before the vehicle will have passed over the spot last raked.

Obviously, the most important feature of my described machine is the manner of and means for, operating the rake 11, and the coöperating teeth 15 whereby the cage is provided and, therefore, while I have found the means employed for swinging the rake and cage (to wit, the reciprocating bar 22) very satisfactory and practicable, I do not wish to be restricted to the use of said bar.

Having thus described my invention, and the manner in which it operates, I claim as new and wish to secure by Letters Patent:—

1. A device of the type described, including opposed rakes, an oscillatory member 22, means for actuating said oscillatory member, comprising pivotally supported arms and links, said arms having pivotal connection with said links and said links having pivotal bail-like connection with said oscillatory member, a driven rotating arm having a sliding connection with said oscillatory member, one of said rakes having its head supported in the aforesaid arms and connected to said links, the head of the other rake being yieldably carried by arms supported in the device, the rake-head by said arms being resiliently held in position.

2. A device of the type described, including opposed rakes, an oscillatory member 22, means for actuating said oscillatory member, comprising arms and links, said arms having pivotal connection with said links and said links having pivotal bail-like connection with said oscillatory member, a driven rotating arm, said arm having a wrist-pin and slot-connection with said oscillatory member, one of said rakes having its head supported in the aforesaid arms and connected to said links, the head of the other rake being supported by said arms pivotally supported by the frame of the device, and a member secured to the head of the aforesaid rake and resiliently holding the first mentioned rake in position.

EDGAR F. BASSETT.

Copies of this patent may be obtained for five cents each, by addressing the "Commissioner of Patents, Washington, D. C."